March 9, 1926.　　　　　　　　　　　　　　　　　　　1,575,911
A. H. GÓMEZ
CALCULATING DEVICE
Filed Nov. 20, 1923　　　2 Sheets-Sheet 1

WITNESSES:
Fred C. Williams
C. N. Cochran

INVENTOR
Aliro H. Gómez
BY
William R. Coley
ATTORNEY

March 9, 1926.  
A. H. GÓMEZ  
1,575,911  
CALCULATING DEVICE  
Filed Nov. 20, 1923 2 Sheets-Sheet 2

WITNESSES:  
Fred C. Williams  
C. N. Cochran

INVENTOR  
Aliro H. Gómez  
BY  
William R. Coley  
ATTORNEY

Patented Mar. 9, 1926.

1,575,911

UNITED STATES PATENT OFFICE.

ALIRO H. GÓMEZ, OF WILKINSBURG, PENNSYLVANIA.

CALCULATING DEVICE.

Application filed November 20, 1923. Serial No. 675,824.

*To all whom it may concern:*

Be it known that I, ALIRO H. GÓMEZ, a citizen of Chile, and a resident of Wilkinsburg, in the county of Allegheny and State of Pennsylvania, have invented a new and useful Improvement in Calculating Devices, of which the following is a specification.

My invention relates to calculating devices, and it has special reference to an apparatus of this character wherein adjustable parts are provided to permit of the solution of mathematical problems.

One object of my invention is to provide a calculating device having a plurality of transversely-extending scales and a plurality of adjustable intercrossing members that are adapted to pass over the chart corresponding to the scales, and the intersecting points of which serve, in conjunction with the scales, to solve various mathematical problems.

Another object of my invention is to provide a device of the above-mentioned character wherein the intersections of one of the adjustable members with co-ordinate lines corresponding to the scales serve to solve problems of multiplication and division.

A further object of my invention is to provide a device of the character in question wherein one of the scales is divided into parts corresponding to the numerals 0 to 10, inclusive, the intercrossing members respectively having pivotal points corresponding to the ends of that scale.

Still another object of my invention is to provide a calculating device having a curved reference line and a divided scale, together with an adjustable member, the intersection of which with the curved line serves to indicate upon the scale the solution of certain trigonometrical problems.

A further object of my invention is to provide a calculating device of the character set forth above and also having a slot therein, together with a structure that is adjustable in said slot and also has one part adjustable over the chart.

Another object of my invention is to provide a calculating device comprising a pair of intercrossing members adapted to pass over a chart and each having scales thereon, together with another member having a scale thereon and movable along a slot in the base member, whereby various angular and linear quantities of triangles may be readily computed.

Other objects of my invention will become evident from the following detailed description, taken in conjunction with the accompanying drawings, wherein Figure 1 is a view, in front elevation, of one form of my calculating device;

Fig. 2 is an elevational view of one of the adjustable intercrossing members that is shown in Fig. 1;

Figure 1:
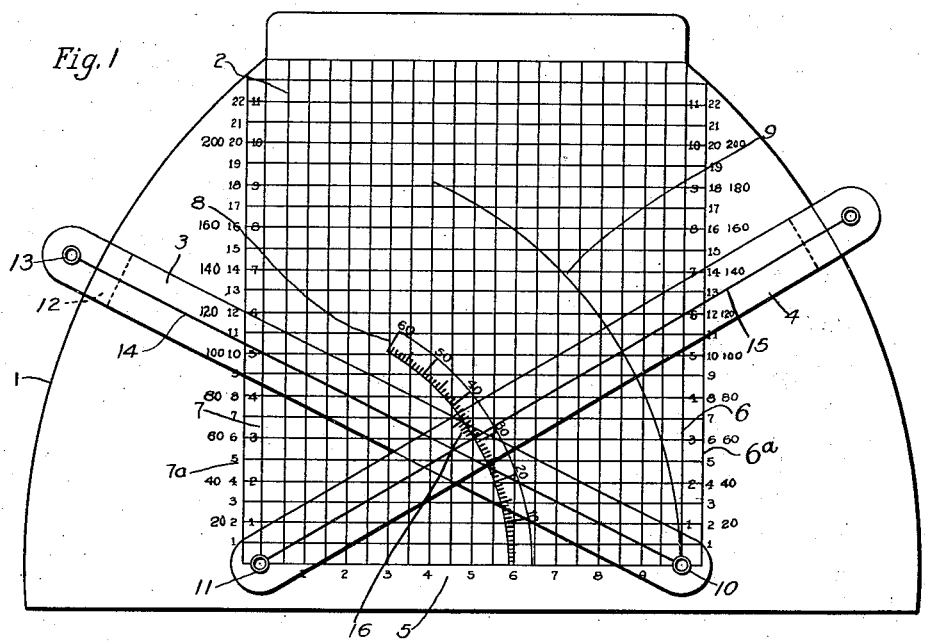

Referring to sheet 1 of the drawings, the structure here shown comprises a suitable base member or plate 1 that may be composed of wood, fiber or any other suitably stiff material, upon which a suitably sub-divided chart 2 is mounted, or printed, over which a pair of intercrossing members or pointers 3 and 4 are adapted to pass. The chart is shown as being provided with a horizontal scale 5 that is divided into parts corresponding to the numerals 0 to 10, inclusive, while a vertical scale 6 is provided on the right-hand side of the chart 2, and a corresponding scale 7 on the left-hand side, for convenience. Furthermore, outer vertical scales $6^a$ and $7^a$, the indicated values of which are double those of the scales 6 and 7, are adapted to be employed where necessary or desirable when employing numbers beyond the range of the inner or small-number scales. In addition, a suitably graduated arc or degree scale 8 is provided for indicating the angle that is formed between the pointer 4 and the horizontal scale 5, while a curved reference line 9, drawn about one end of the scale 5 as a center and passing through the other end of the scale 5, is adapted to be employed for a purpose to be hereinafter set forth.

The left-hand pointer 3 is suitably pivoted at the right-hand end of the scale 5, a suitable grommet or eyelet 10, for example, being utilized for the purpose. In a similar manner, the adjustable right-hand pointer 4 is pivotally mounted at the left-hand end of the scale 5, by means of a grommet 11.

Figure 2:
Fig. 2 is an enlarged end or edge view of the apparatus, showing certain details of construction thereof.
Figure 3:
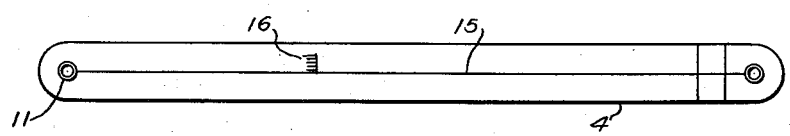

As will be seen from Fig. 2, each of the pointers 3 and 4 is provided, at its outer end, with a suitable tab or the like 12, that is adapted to engage the rear side and corresponding curved edge of the base member 1, the tab being secured to the pointer 3, for example, by means of a grommet 13 and being suitably reinforced. The purpose of this construction is to enable the outer end of the pointers to smoothly ride over the corresponding curved edges of the base member 1, as will be clearly evident from Fig. 1. Thus, the necessary angular adjustments of the pointers 3 and 4 may be readily effected and, moreover, the pointers remain in the adjusted positions by reason of the friction between the relatively movable parts.

The pointers or arms 3 and 4 may be made of any suitable material, such as transparent celluloid or the like, and are severally provided with central reference marks or lines 14 and 15, respectively. It will be noted that these reference lines pass through the pivotal points of the pointers; that is, through the respective ends of the horizontal scale 5. It will be understood that, if desired, suitable threads may be strung taut and employed in lieu of the pointers 3 and 4, or that other modifications may be utilized.

For the purpose of accurately determining the angular position of the pointer 4; that is, the angle between the pointer and the horizontal scale 5, a Vernier scale 16 is provided on the pointer 4 in a suitable position with respect to the graduated arc 8.

Various methods of employing my calculating device for the solution of different mathematical problems may be set forth briefly as follows:

For multiplication, place the right-hand pointer 4 in such a position that the central thread or line 15 engages the vertical scale line, passing through the right-hand end of the horizontal scale 5, at one of the factors in question. In other words, employ one of the factors as an ordinate relative to the reference line 15. For example, 12 may be selected as one of the factors, and the pointer 4 is illustrated as in the correct position for this operation. Then, assuming that 5 is the other factor (or abscissa), by following the vertical co-ordinate line corresponding to 5 on the horizontal scale until it intersects the reference line 15 and reading the solution by projection on either of the vertical scales, it will be noted that a product of 60 is obtained.

For division, the reverse operation is employed: that is, the pointer 4 is set at a position corresponding to one of the factors and, by noting the point on the horizontal scale corresponding to the intersection of the horizontal co-ordinate line, indicating the product, on the reference line 15, the other factor (that is, the desired quotient) will be obtained.

For squaring, both factors, of course, are made equal, and the above-mentioned operation is followed. By suitable repetition, numbers may readily be raised to the third power, fourth power, etc., as will be understood.

To obtain the square root of a number, the pointer 4 should be moved over the chart, noting the point of intersection of the reference line 15 with the horizontal co-ordinate line corresponding to the number whose square root is to be extracted. As soon as the co-ordinate values on both, the vertical and the horizontal scales: that is, the ordinate and the abscissa, corresponding to the intersection of the reference line 15 with the aforesaid co-ordinate line corresponding to the number become equal, the square root in question is thus indicated on either scale: on the horizontal scale by the projection of the intersecting point and on the vertical scale by its intersection with the reference line 15. It will be understood that any root whose index is a multiple of 2 may be readily extracted by merely repeating the process for extracting the square root.

The two intercrossing pointers 3 and 4 may be employed to solve directly for any unknown quantity in an equation of the following form, corresponding to the calculation of the combined electrical or ohmic resistance of a group of parallel circuits, for instance:

$$\frac{1}{R} = \frac{1}{r_1} + \frac{1}{r_2} + \frac{1}{r_3} \cdots \text{ or } R = \frac{r_1 r_2 r_3 \cdots}{r_1 r_2 + r_1 r_3 + r_2 r_3 \cdots}.$$

For example, assuming that $r_1$ equals 4 and $r_2$ equals 8 and $r_3$ equals 10, R may be solved for as follows: Take two of the known quantities, such as 4 and 8, one on each of the vertical scales, by means of the respective pointers 3 and 4, and read the result on the vertical scale at the projection of the point of intersection of the two reference lines 14 and 15 of the pointers. In the present example, this partial solution of R will be 2.67. By resetting the left-hand pointer 3, for example, on the value 2.67 and placing the right-hand pointer 4 on the remaining known factor 10, the final answer will be indicated on the vertical scale at the projection point corresponding to the crossing of the reference lines 14 and 15, namely 2.11.

To solve for any one of the quantities $r_1$, $r_2$ and $r_3$, where R and the others are known, two of the known quantities should be employed by placing the pointers 3 and 4 at points on the vertical scales respectively corresponding thereto. The result of this operation (that is, the value of point of projection of the intersection on the vertical scale) should be used for resetting one of the pointers and then the other pointer should be moved until the projection point on the vertical scale equal to R corresponds to the point of intersection of the reference lines 14 and 15. The point on the vertical scale that coincides with a point on the reference line of the last-moved pointer will indicate the desired answer.

For the solution of trigonometrical functions, the right-hand pointer 4 may be employed, and, by setting it at the desired angle, as indicated by the graduated arc 8, the sine may be read directly on the vertical scale at the point corresponding to the point of intersection of the reference line 15 with the curved reference line 9 on the chart. For example, if the sine of thirty degrees is desired, by placing the pointer 4 in the corresponding position, the horizontal projection of the point of intersection of the reference line with the curved reference line 9 on the vertical scale will be found to be 0.5.

For the cosine, the same setting is employed, and the value on the horizontal scale corresponding to the point of intersection of the reference lines 15 and 9 is the desired answer. In the assumed case, namely thirty degrees, the cosine will be indicated as 0.866.

The tangent of any desired angle may be found by placing the pointer 4 at the desired angle and reading, on the right-hand vertical scale, the value corresponding to the intersection of the reference line 15 with the vertical scale.

It will be understood that, in case the values of the trigonometrical functions themselves are known, then, by placing the pointer in the proper location following the rules just outlined, the angle itself may be read on the graduated arc 8.

The apparatus may also be employed for other purposes, such as for calculating the transmission of electrical power in a direct-current system. For example, to find the proper cross-section of a wire to transmit a given amount of power to a certain distance, proceed as follows: Divide the current in amperes by the voltage drop that is permissible (usually two or three percent of the voltage, for lighting purposes) and multiply the quotient by the distance in feet that the power is to be transmitted, following the above-given rules for division and multiplication. Then, place the pointer on #11 of the right vertical scale and, by using the figure obtained by the previous calculation on the horizontal scale, the required section of the wire in circular mils may be read on the right-hand vertical scale at the point corresponding to the intersection of the vertical co-ordinate line with the reference line 15.

To solve an equation of the general form:

$$a = \frac{b}{b+c} \text{ or } b = \frac{ac}{1-a} \text{ or } c = \frac{b(1-a)}{a},$$

in solving for $a$, if $c$ is larger than $b$ and constitutes the numerator, the smaller number $b$ should be employed in setting the right-hand pointer, and the larger number $c$ in setting the left-hand pointer. Then read $a$ at the point of intersection as projected on the horizontal scale. If the smaller quantity $b$ constitutes the numerator, then set the right-hand pointer corresponding to the larger figure and the left-hand pointer corresponding to the smaller figure.

In solving for $b$, if the value of $a$ is less than ½, the larger known quantity, for example, $c$, should be employed in connection with the right-hand pointer. In this case, the other pointer should be adjusted until the quantity $a$ appears on the horizontal scale at the projection point corresponding to the intersection with the reference line 15. Then the quantity $b$ may be read on the left vertical scale at the horizontal projection point of the intersection.

If the value of $a$ is more than ½, the operation should be reversed; that is, the smaller quantity should be taken on the right-hand scale.

In solving for $c$, if the value of $a$ is more than ½, $b$ is the larger quantity and should be employed on the left vertical scale. Then the right-hand pointer should be moved until, at the vertical projection of the intersection of the reference lines, the quantity $a$ is indicated. Then $c$ may be read on the left scale at the horizontal projection point. If the value of $a$ is less than one-half, then the smaller quantity, $b$, should be employed on the left-hand scale, and the equation solved as just outlined.

For solving problems in proportion, the proportion may be written in the form $$x = \frac{a \times b}{c},$$

where $\frac{a}{c}$, for example, is the proportionality factor. Solve for the quantity $a$ divided by $c$, or $b$ divided by $c$, as explained above. Then, keeping this setting, take the other factor on the horizontal scale and read the result on the vertical scale at the projection of the point where the co-ordinate line of this factor intercepts the pointer reference line.

Figure 4:
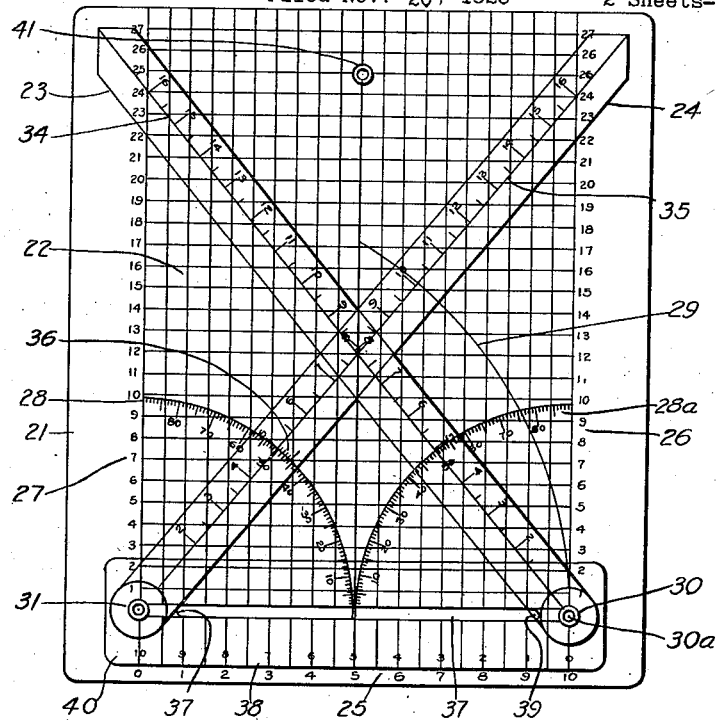
Fig. 4 is a view, in front elevation, of a modification of the device that is shown in Fig. 1.
Figure 5:
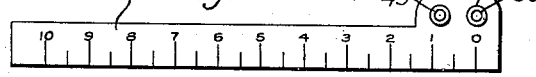
Figs. 5, 6 and 7 are elevational views of certain members and parts of a further modification of the apparatus that is shown in Fig. 4.
Figure 6:
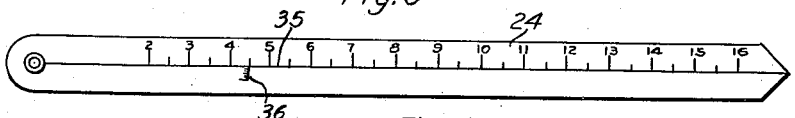

In Fig. 4, a substantially rectangular base member or plate 21 is employed having a chart 22 thereon, over which adjustable pointers 23 and 24 may pass. The chart 22 is provided with a horizontal scale 25 corresponding to the previously-mentioned scale 5 and vertical scales 26 and 27. In addition, a pair of graduated arcs or degree scales 28 and 28ª are shown, and a curved reference line 29, which corresponds to the curved reference line 9.

The pointer 23 is pivotally mounted at the right-hand end of the horizontal scale 25, and a pin or screw 30ª may extend through the grommet at that point to constitute a handle or button, for a purpose to be set forth.

The other pointer 24 is pivotally mounted at the left-hand end of the scale 25, as indicated at 31. The pointers 23 and 24 are respectively provided with the central reference lines 34 and 35 and also with suitable scales. In addition, a Vernier scale 36 is provided on one of the pointers 24, for the same purpose as described in connection with Fig. 1.

A slot 37 is cut in the base member 21 parallel to the horizontal scale 25 and along the line between the two pivotal points 30 and 31 of the pointers. The pointer 23 is pivotally mounted in the slot, being provided with a suitable washer, nut, or the like, on the rear side of the pin or screw 30ᵃ, and is adapted to slide therewithin and carry a horizontally-extending scale or slide 38, which has graduations thereon corresponding to those of the scale 25, but running in the opposite direction. To maintain the member 38 in its proper position, a slot 39 therein registers with the slot 37 and is adapted to receive the left-hand grommet 31, which thereby effects a suitable guiding action on the slide 38. An eyelet 41 may be provided to permit use of the device when hanging on a wall.

Upon moving the pointer 23 and the slide 38 to any desired location wherein the vertical reference line passing through the pivotal point 30 coincides with the line on the fixed scale 25 indicating the sum of any two numbers, by reading one of them on the horizontal scale 25, the other appears directly above it on the movable scale 38.

In this way, problems in subtraction may be solved. By placing the right end line of the slide 38 on the minuend, directly below the subtrahend, taken on the slide, the answer or difference will be found on the fixed scale 25.

For problems in addition, the reverse operation may be employed, as will be understood.

The apparatus shown in Fig. 4 is, moreover, adapted for the solution of triangles when two sides and one angle or two angles and one side or three sides are given. For example, if one angle is known, the right-hand pointer 24 may be set at that angle, by means of the degree scale 28 and, by adjusting the left-hand pointer 23 so that the slide 38 assumes a location corresponding to the length of one side, the pointer 23 itself may be adjusted over the chart until the correct length of the other known side appears on the intercrossing pointer 24. The third side may then be read on the intercepted portion of the pointer 23.

When the three sides are known and the angles are to be found, take one side on each pointer and the third side on the horizontal scale or slide 38. Then read the angle between the right pointer 24 and the slide. To find a second angle, reverse the positions of the pointers 23 and 24 so that each now corresponds to the side that the other corresponded to in the prior operation, and read the second angle between the same pointer 24 and the slide 38. The third angle may, of course, be obtained by subtracting the two angles just found from 180 degrees.

If two angles and one side are known, the two pointers 23 and 24 may be set on the corresponding angles, as measured by the respective degree scales 28 and 28ᵃ. Then, by simply grasping the pin 30ᵃ, or the right-hand end of the slide 38, the slide may be moved to a point corresponding to the length of the known side. The two unknown sides may then be read directly on the two pointers, as the pointer 23 will retain the proper angular position during such movement.

Figure 7:
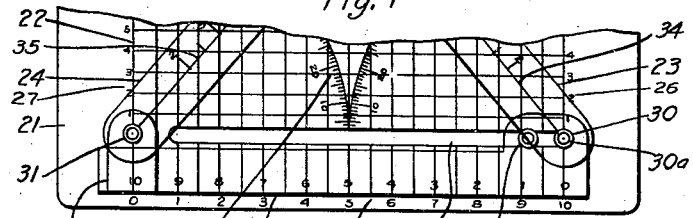

In Fig. 7, a modification of the slide structure shown in Fig. 4 is illustrated. The base member 21, pointers 23 and 24, grommets 30 and 31 and slot 37 are utilized as previously set forth. The pointer 23 is adapted to carry a horizontally-extending scale or slide 42, which corresponds to the above-noted slide 38. To maintain the member 42 in its proper position, a third grommet 43 is provided in the member 42 within the slot 37, and a tab 44 extends downwardly from the grommet 31, to effect a suitable guiding action on the slide 42.

It will be seen that I have thus provided a calculating device that is relatively simple in construction and easy to operate and which, moreover, permits of the accurate and ready solution of various mathematical problems.

I do not wish to be restricted to the specific structural details or arrangement of parts herein set forth, as other modifications thereof may be effected therein or other mathematical problems may be solved thereby without departing from the spirit and scope of my invention. I desire, therefore, that only such limitations shall be imposed as are indicated in the appended claims.

I claim as my invention:—

1. A calculating device having a plurality of transversely-extending scales, one of said scales being divided into parts corresponding to the numerals 0 to 10, inclusive, and a plurality of intercrossing members respectively having pivotal points corresponding to the ends of said one scale.

2. A calculating device having a plurality of transversely-extending scales, one of said scales being divided into parts corresponding to the numerals 0 to 10, inclusive, and a plurality of intercrossing members respectively having pivotal points corresponding to the ends of said one scale, the intersecting points of said members serving in conjunction with said scales to solve certain mathematical problems.

3. A calculating device having a plurality of scales extending at substantially right angles to each other, one of said scales being divided into parts corresponding to the numerals 0 to 10, inclusive, and a plurality of intercrossing members respectively having pivotal points corresponding to the ends of said one scale.

4. A calculating device having a plurality of scales extending at substantially right angles to each other, one of said scales being divided into parts corresponding to the numerals 0 to 10, inclusive, and a plurality of manually-adjustable intercrossing members respectively having pivotal points corresponding to the ends of said one scale, the intersecting points of said members being adapted to indicate with respect to said scales the solution of certain mathematical problems.

5. A calculating device having a plurality of scales extending at substantially right angles to each other and a curved reference line, and a member adjustable with respect thereto, the intersection of said member with said curved line serving, in conjunction with said scales, to indicate trigonometrical functions of the angle between said member and one of said scales.

6. A calculating device having a plurality of scales extending at substantially right angles to each other and a curved reference line passing through the point of intersection of said scales, and a member adjustable with respect thereto, the intersection of said members with said curved line serving in conjunction with said scales to indicate trigonometrical functions of the angle between said member and one of said scales.

7. A calculating device having a plurality of scales extending at substantially right angles to each other, and a curved reference line passing through the point of intersection of said scales, and a member adjustable with respect thereto, and pivotally mounted at the opposite end of one scale from its intersection with the other scale, the intersection of said member with said curved line serving in conjunction with said scales to indicate trigonometrical functions of the angle between said member and said one scale.

8. A calculating device comprising a base member having a chart with a scale thereon and having a slot extending substantially parallel to said scale, and a structure adjustable in said slot and having one part adapted to slide along said slot and having another part adjustable over said chart, the first-named part having a scale corresponding to the scale on said chart but having its numerals running in the opposite direction to the numerals on said scale, whereby problems in addition and subtraction of numbers may be solved.

9. A calculating device comprising a base member having a chart thereon and having a slot therein, and a plurality of intercrossing members pivotally mounted in the base member and in said slot, respectively, and adapted to pass over said chart.

10. A calculating device comprising a base member having a chart with a scale thereon and having a slot extending substantially parallel to said scale, and a plurality of intercrossing members pivotally mounted in the base member and in said slot, respectively, and adapted to pass over said chart.

11. A calculating device comprising a base member having a chart with a scale thereon and having a slot extending substantially parallel to said scale, a pair of intercrossing members pivotally mounted in the base member and in said slot, respectively, and a fourth member adapted to slide along said slot with one of said intercrossing members.

12. A calculating device comprising a base member having a chart with a scale thereon and having a slot extending substantially parallel to said scale, a pair of intercrossing members pivotally mounted in the base member in alinement with said slot and in said slot, respectively, and a fourth member adapted to slide along said slot with one of said intercrossing members, said pair of members and said fourth member having scales thereon, whereby the angular and linear quantities of triangles may be computed.

13. A calculating device comprising a base member having a chart with a scale thereon and having a slot extending substantially parallel to said scale, a pair of intercrossing members pivotally mounted in the base member and in said slot, respectively, a fourth member adapted to slide along said slot with one of said intercrossing members, and means associated with the intercrossing member pivotally mounted in the base member for guiding said fourth member.

14. A calculating device, comprising a base member having a chart with a scale thereon and having a slot extending substantially parallel to said scale, a pair of intercrossing members pivotally mounted in the base member in alinement with said slot and in said slot, respectively, a fourth member adapted to slide along said slot with one of said intercrossing members, said pair of members and said fourth member having scales thereon, whereby the angular and linear quantities of triangles may be computed, and a tab secured by the pivotal mounting of the intercrossing member pivotally mounted in the base member for overlapping and guiding said fourth member.

15. A calculating device comprising a base member having a chart with a scale thereon and having a slot therein, a pair of intercrossing members having pivotal mountings in the base member and in said slot, respectively, and a fourth member pivotally mounted with one of said intercrossing members and having a slot engaging the pivotal mounting of the other intercrossing member for guiding purposes.

16. A calculating device comprising a base member having a chart with a scale thereon and having a slot extending substantially parallel to said scale, a pair of intercrossing members pivotally mounted in the base member in alinement with said slot and in said slot, respectively, and a fourth member adapted to slide along said slot with one of said intercrossing members, said fourth member having a slot registering with the first-named slot and engaging the fixed pivotal mounting of one of said intercrossing members for guiding purposes.

In testimony whereof, I have hereunto subscribed my name this 16th day of November, 1923.

ALIRO H. GÓMEZ.